United States Patent
Sharangpani et al.

[11] Patent Number: 6,105,047
[45] Date of Patent: *Aug. 15, 2000

[54] METHOD AND APPARATUS FOR TRADING PERFORMANCE FOR PRECISION WHEN PROCESSING DENORMAL NUMBERS IN A COMPUTER SYSTEM

[75] Inventors: Harshvardhan Sharangpani, Santa Clara, Calif.; Roger Golliver, Beaverton, Oreg.

[73] Assignee: Intel Corporation, Santa Clara, Calif.

[*] Notice: This patent is subject to a terminal disclaimer.

[21] Appl. No.: 09/188,868

[22] Filed: Nov. 9, 1998

Related U.S. Application Data

[63] Continuation of application No. 08/554,978, Nov. 13, 1995, Pat. No. 5,886,915.

[51] Int. Cl.[7] .............................. G06F 7/38; G06F 7/00; G06F 15/00
[52] U.S. Cl. .................. 708/495; 708/200; 708/510; 708/525
[58] Field of Search .................. 708/495–505, 708/510, 525; 395/800.23

[56] References Cited

U.S. PATENT DOCUMENTS

| | | | |
|---|---|---|---|
| 4,800,516 | 1/1989 | Si et al. .................. | 708/505 |
| 4,926,370 | 5/1990 | Brown et al. .................. | 708/497 |
| 5,268,855 | 12/1993 | Mason et al. .................. | 708/513 |
| 5,337,265 | 8/1994 | Desrosiers et al. .................. | 708/505 |
| 5,375,212 | 12/1994 | Saini .................. | 395/591 |
| 5,384,723 | 1/1995 | Karim et al. .................. | 708/205 |
| 5,416,912 | 5/1995 | Saini .................. | 395/591 |
| 5,421,021 | 5/1995 | Saini .................. | 395/387 |
| 5,602,769 | 2/1997 | Yu et al. .................. | 708/503 |
| 5,685,009 | 11/1997 | Blomgren et al. .................. | 395/800.23 |

OTHER PUBLICATIONS

Intel i860TM 64–BIT Microprocessor (Oct. 1990).

Intel i860TM 64–BIT Microprocessor Programmer's Reference Manual i860 (1989).

*Primary Examiner*—Emmanuel L. Moise
*Attorney, Agent, or Firm*—Gene Su

[57] ABSTRACT

An apparatus to improve the speed of handling of denormal numbers in a computer system, the apparatus comprising a mode bit and a selector, the mode bit set when denormals are to be replaced by zero, the selector having a first input and an output, the first input comprising a floating point number, the selector selecting zero to become the output when the floating point number is denormal and the mode bit is set, the selector selecting the floating point number to become the output otherwise.

21 Claims, 3 Drawing Sheets

METHOD AND APPARATUS FOR TRADING PERFORMANCE FOR PRECISION WHEN PROCESSING DENORMAL NUMBERS IN A COMPUTER SYSTEM

This application is a continuation of prior application Ser. No. 08/554,978, filed on Nov. 13, 1995 now U.S. Pat. No. 5,886,915.

BACKGROUND

1. Field of the Invention

The invention relates to the field of floating point numbers, and more particularly to processing of denormal floating point numbers in a digital computer system.

2. Art Background

An exemplary microprocessor, such as the Pentium™ brand processor which is a product of Intel® Corporation, Santa Clara, Calif., represents real numbers of the form $(-1)sЕ(b0.b1b2b3 \ldots bp-1)$ where:

s=0 or 1

E=any integer between Emin and Emax, inclusive bi=0 or 1 p=number of bits of precision

Table 1a summarizes the parameters for each of the three real-number formats. The Pentium brand processor stores real numbers in three-field binary format that resembles scientific, or exponential notation. The significand field, $b0b1b2b3 \ldots bp-1$, is the number's significant digits. (The term "significand" is analogous to the term "significand" used to describe floating-point numbers on some computers.) The exponent field, e+E=bias, locates the binary point within the significant digits (and therefore determines the number's magnitude). (The term "exponent" is analogous to the term "characteristic" used to describe floating-point numbers on some conventional computers.) A 1-bit sign field indicates whether the number is positive or negative. Negative numbers differ from positive numbers only in the sign bits of their significands.

TABLE 1a

|  | Single | Double | Extended |
| --- | --- | --- | --- |
| Total Format Width | 32 | 64 | 80 |
| p (bits of precision) | 23 | 53 | 64 |
| Exponent bits | 8 | 11 | 15 |
| Emax | +127 | +1023 | +16383 |
| Emin | −126 | −1022 | −16382 |
| Exponent Bias | +127 | +1023 | +16383 |

The single real format is appropriate for applications that are constrained by memory, but it should be recognized that this format provides a smaller margin of safety. It is useful for the debugging of algorithms, because roundoff problems will manifest themselves more quickly in this format. It is often used in graphics applications as well. For most microcomputer applications over the last decade, the double real format has provided sufficient range and precision to return correct results with a minimum of programmer attention. Most processors have optimized their computational paths to provide the maximum performance on operations on the double real format. The extended real format was originally developed with an intent to hold intermediate results, loop accumulations, and constants. Its extra length was designed to shield final results from the effects of rounding and overflow/underflow in intermediate calculations.

As microprocessor performance increases (by talking advantage of the improvements in the technology of Very Large Scale Integration), applications develop that exploit this increase in performance to deliver more utility. These new applications operate on larger data sets and invoke more complex calculations that are more prone to roundoff errors. The extended format is useful in these applications, not just as an intermediate format, but also as a format for input and output operands. With the need to support the extended format as outlined above, future processors must now be designed to support computation on three real number floating point formats in their computational paths.

The floating point unit (FPU) of the processor usually retains floating point numbers in normalized form. This means that, except for the value zero, the significand contains an integer bit and fraction bits as follows:

1.fff...ff where "." indicates an assumed binary point. The number of fraction bits varies according to the real format: 23 for single, 52 for double, and 63 for extended real. By normalizing real numbers so that their integer bit is always a 1, the processor eliminates leading zeros in small values. This technique maximizes the number of significant digits that can be accommodated in a significand of a given width. Note that, in the single and double formats, the integer bit is implicit and is not actually stored in memory; the integer bit is physically present (explicit) in the extended format only.

If one were to examine only the significand with its assumed binary point, all normalized real numbers would have values greater than or equal to one and less than two. The exponent field locates the actual binary point in the significant digits. Just as in decimal scientific notation, a positive exponent has the effect of moving the binary point to the right, and a negative exponent effectively moves the binary point to the left, inserting leading zeros as necessary. An unbiased exponent of zero indicates that the position of the assumed binary point is also the position of the actual binary point.

The exponent field, then, determines a real number's magnitude. In order to simplify comparing real numbers (e.g., for sorting), the processor stores exponents in a biased form. This means that a constant, called a bias, is added to the true exponent described above. As Table 1a shows, the value of this bias is different for each real format. The bias is chosen so as to force the biased exponent to be a positive value. A number's true exponent can be determined simply by subtracting the bias value of its format. In the 80×86™ family of processors, a product of Intel Corporation, the single and double real formats exist in memory only. If a number in one of these formats is loaded into an FPU register, is automatically converted to extended format, the format used for all internal operations. Likewise, data in registers can be converted to single or double real for storage in memory.

When a numeric value becomes very close to zero, normalized floating point storage cannot be used to express the value A number R is said to be tiny (also commonly referred to as subnormal) when $-2^{Emin} < R < 0$ or $0 < R < +2^{Emin}$. (For a typical case, Emin is −126 for single format, −1022 for double format, an −16382 for extended format.) In other words, a nonzero number is tiny if its exponent would be too negative to store in the destination format, while retaining the number in normalized form.

To accommodate these instances, the processor can store and operate on real numbers that are not normalized, i.e., whose significands contain one or more leading zeros. Denormals arise when the result of a calculation yields a value that is tiny.

Denormal values have the following properties:

The biased floating-point exponent is stored at its smallest value. For single precision numbers, this minimum exponent value is −126. For double precision, the minimum exponent value is −1022. For the extended precision format, the minimum exponent value is −16382. For all formats, when the number is denormal the minimum exponent is encoded with a bit pattern of all zeros.

The integer bit of the significand (whether explicit or implicit) is zero.

It is important to note that interpretation of the exponent encoding for denormal numbers differs from the interpretation of the exponent encoding for normalized numbers. For denormalized numbers, the exponent is encoded with the bit pattern of all zeros, although this pattern is interpreted to have a value which is the minimum exponent value (which is −126 for single format, −1022 for double real format, and −16382 for the extended real format). Hence, interpreting such denormal numbers by merely adding the bias of the format to the exponent encoding of the denormal number will produce an exponent value that is off by one. Denormals and true zeros both have exponents encoded with all zeros, although the interpretation of these encodings differ.

As a number becomes smaller, it gradually transitions from a normal representation to a denormal representation. Table 1b below illustrates this process for a single precision number.

TABLE 1b

| Exponent Value | Significand Value (includes explicit bit) | Encoding Exponent | Significand Encoding (no explicit bit) | Description of number |
|---|---|---|---|---|
| 1. 0 × 3f81 | 1.0000000 . . . 01 | 00000001 | 0000000 . . . 01 | Smallest single precision normal |
| 2. 0 × 3f81 | 1.0000000 . . . 00 | 00000001 | 0000000 . . . 00 | Largest single precision denormal |
| 3. 0 × 3f81 | 0.1111111 . . . 11 | 0000000 | 1111111 . . . 11 | |
| 4. 0 × 3f81 | 0.1111111 . . . 10 | 0000000 | 1111111 . . . 10 | Smallest single |
| 5. 0 × 3f81 | 0.0000000 . . . 01 | 0000000 | 0000000 . . . 01 | True Zero |
| 6. 0 × 0000 | 0.0000000 . . . 00 | 0000000 | 0000000 . . . 00 | |

Entry one in Table 1b shows a normal number which is very close to becoming denormal. Entry two shows the smallest possible normal number which can be stored in the single format. Entry three shows the denormal number which results when the normal number in entry two loses a value equal to one digit in the last place. The exponent of the number is encoded as zero, although its value remains at the minimum exponent for a single precision number. The significand bits are set to all ones. Entry five shows the smallest denormal number which can be represented by the single precision format.

Denormals typically receive special treatment by processors in three respects:

The processor avoids creating denormals whenever possible. In other words, it always normalizes real numbers except in the case of tiny numbers.

The processor provides the unmasked underflow exception to permit programmers to detect cases when denormals would be created.

The processor provides the unmasked denormal operand exception to permit programmers to provide a tailored response in the presence of denormal operands.

Denormalizing means incrementing the true result's exponent by a certain amount, and inserting a corresponding number of leading zeros in the significand, shifting the rest of the significand by the same amount to the right. The denormalization process causes loss of precision if significant low-order bits are shifted off the right end of the significand field. In a severe case, all the significant bits of the true results are shifted off and replaced by the leading zeros. In this case, the result of denormalization yields a zero. Clearly, a significant amount of processing is required to handle denormal numbers in a computer system. When applications generate a large number of denormals, they can often tolerate a loss of precision while benefitting from increased performance due to faster denormal processing. For these applications, it is advantageous from a performance standpoint if the processing of denormal numbers is made faster, even at the cost of some loss in precision.

Typical prior art implementations map floating point data loaded from memory to the FPU from the originating format in memory to the extended format in the FPU registers. This mapping in the prior art has entailed, on a load instruction, a full conversion of the data from the originating format into the extended precision format. Likewise, on the store instruction, this has entailed a complete conversion of the data from the extended precision format (in the FPU register file) to the destination format of the result in memory.

In the prior art, conversion of the data on the load instruction typically includes the following:

Detection of denormal numbers in the originating format.

Generating an exception when the input operand is a denormal number and the denormal exception is unmasked.

Normalization of the denormal number in the event that the input operand is a denormal number and the denormal exception is masked.

Examination of the input operand to check whether it is encoded to have a special interpretation, such as a signaling Not-A-Number (NaN) encoding. If this is true, the FPU delivers an interrupt for the invalid operation exception when the invalid operation exception is unmasked.

As can be seen from the above, implementations on the prior art must examine the input operand being loaded in order to determine whether there will be any exceptions. Exceptions include the denormal operand exception response and the invalid operation exception response. Thus, implementations on the prior art incur data-related exceptions upon the loading of floating point operands.

In the event that the denormal operand exception is masked, prior art processors must normalize input operands which are denonmal numbers. This normalization operation requires, among other circuits, a hardware shifter. Modem processors typically execute several load instructions in parallel, requiring potentially several dedicated shifters on the chip. Since dedicated hardware for multiple shifters is expensive in terms of silicon die cost, some implementations may use schemes by which several load paths to the FPU arbitrate for a single shifter, adding design complexity. A more common alternative is to complete the normalization process by invoking on-chip microcode. Upon determining that the data being loaded is denormal, a micro-exception delivers control to a microcode handler. The microcode handler uses existing shifters in the FPU (shifters necessary for supporting the floating point add operation, for example)

to execute the normalization of the loaded operand. Thus, implementations on the prior art need to provide either dedicated shifters for each load path, added design complexity to arbitrate for a single shifter, or take a micro-exception to enable microcode to complete the normalization.

Modem pipelines processors employ techniques that include deep pipelining, as well as parallel instruction execution. These modem processors execute several instructions concurrently at each stage of the pipeline. Typically, a load operation on these processors takes several cycles to complete its execution. A common prior art technique is to enable execution of instructions following a load instruction even before the loaded data is returned, as long as the subsequent instructions do not depend upon the loaded data. To complete the execution of these subsequent instructions, and to update the architectural state of the FPU with the result of these instructions, it is important to determine that there are no exceptions or micro-exceptions on all prior instructions.

Because the FPU takes several cycles to complete a load instruction, and because the load instruction may incur data-related exceptions or micro-exceptions, it is necessary to temporarily retain the execution results of instructions following the load instruction in a buffer (sometimes called a retirement buffer). The results are retained until such time as any data-related exceptions or micro-exceptions incurred by the load instruction are determined. Because it takes several cycles to make this determination, and because modern processors execute several instructions in parallel, the number of instructions subsequent to the load that will execute before the determination is made may be very large. A very large retirement buffer is then required to store these pending results. The size of this buffer poses an appreciable cost both in terms of silicon die cost as well as design complexity.

Especially with applications that generate a large number of denormals, it would be advantageous from a performance and hardware complexity standpoint to eliminate the need to take denormal exceptions on operand load, or during operand execution, even at the cost of some precision.

Some specialized numerical applications generate a great many denormals. Denormals are likely to arise when an application generates a great many intermediate computational values. In some parallel processing applications, a computational task is often divided into subtasks to execute on multiple processors in parallel. If one subtask produces a disproportionate quantity of denormals, and the other subtasks depend upon its timely completion, the subtask with more denormals may become a bottleneck to the completion of the overall task at hand. Especially in these applications, improvements in the speed of the handling of denormals by the processor can produce substantial performance benefits.

SUMMARY OF THE INVENTION

An apparatus to improve the speed of handling of denormal numbers in a computer system, the apparatus comprising a mode bit and a selector, the mode bit set when denormals are to be replaced by zero, the selector having a first input and an output, the first input comprising a floating point number, the selector selecting zero to become the output when the floating point number is denormal and the mode bit is set, the selector selecting the floating point number to become the output otherwise.

DETAILED DESCRIPTION

In the following description, numerous specific details are set forth such as circuits, flow diagrams, etc, in order to provide a thorough understanding of the present invention. In other instances, well-known structures and techniques have not been shown in detail because to do so sould unnecessarily obscure the present invention. The specific arrangements and methods described herein are merely illustrative of the principles of the invention. Numerous modifications in form and detail may be made by those of ordinary skill in the art without departing from the scope of the present invention. For example, the invention described herein is not limited to any particular number of bits in either the significand or exponent fields of a floating point number.

Figure 1:
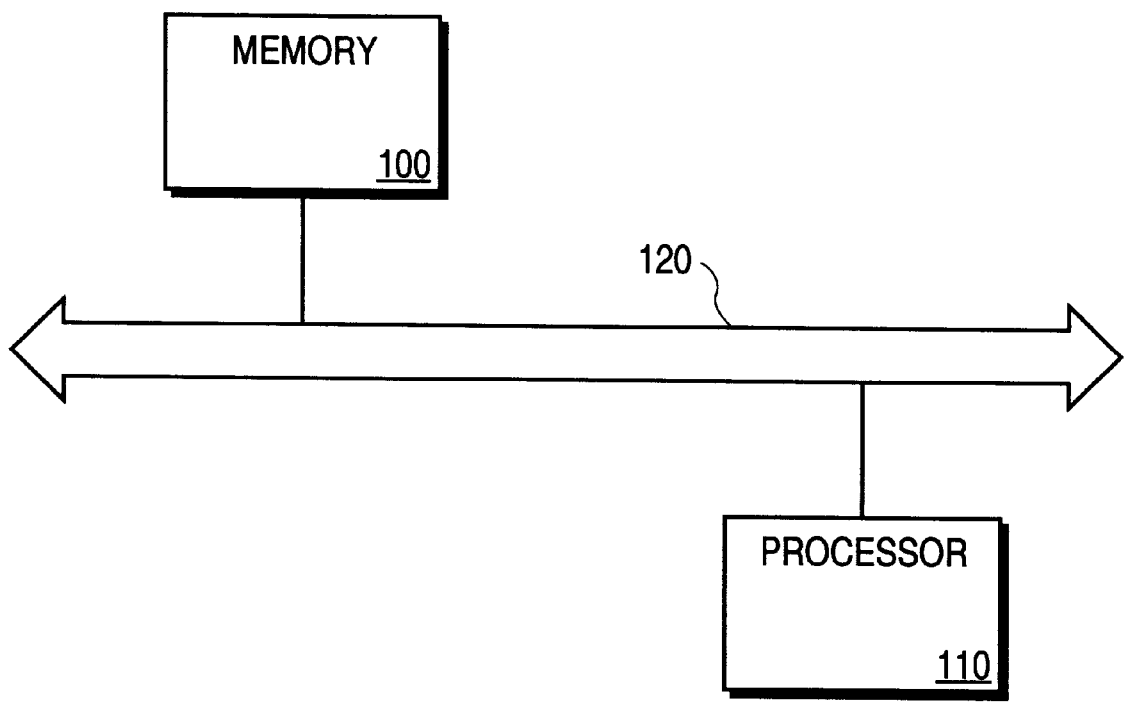
FIG. 1. shows a system for processing denormal floating point numbers.

FIG. 1 shows the elements of a system for processing denormal floating point numbers in a computer. The system comprises a processor 110 for executing instructions. Instructions are typically stored in a memory such as the one shown in element 100. The memory 100 may be a Random-Access-Memory (RAM), a cache memory, a Read-Only-Memory (ROM), a flash memory, or any other form of memory device which is capable of storing instructions which are executed by a processor element 110. Instructions are typically supplied to the processor 110 over bus element 120. In this example the memory 100 and the processor 110 are shown as separate elements, however, one skilled in the art will readily appreciate that the memory 100 and the processor 110 may be combined into a single integrated device, such as an on-chip flash memories. In addition to storing instructions for execution on the processor, memory 100 may also store data to use with those instructions and temporary variables and other intermediate information resulting from execution of those instructions. One of ordinary skill in the art will also appreciate that bus element 120 may be implemented in numerous ways familiar in the art of processor system design, for example, using an electrically conductive material, or using optical coupling.

The processor 110 may include registers for storing data, instructions, and pointers for managing execution of the computer program. The processor 10 may include integer registers for storing data with an integer format, floating point registers for storing data with a floating point format, and registers for storing both integer format and floating point format data. The processor 110 may include status registers for managing execution of a computer program. Status registers may include an instruction pointer register (IP) for storing the address of the next instruction to be executed. Status registers may also include stack registers for managing the execution stack of a computer program. Status registers may also include one or more flag registers for managing the evaluation of conditional statements in the computer program. The processor 110 may also include address registers for storing the addresses of instructions and data. Address registers may include base, index, and offset registers for managing the different addressing modes in both segmented and flat memory architectures.

Denormal numbers are processed by the system in several ways. They may be input to the processor from memory 100 to processor 110 over bus 120. Or, they may be generated as intermediate results of calculations and saved in registers internally by processor 110. Or, they may be generated as the final results of calculations by processor 110 and saved to memory 100 over bus 120.

Figure 2:
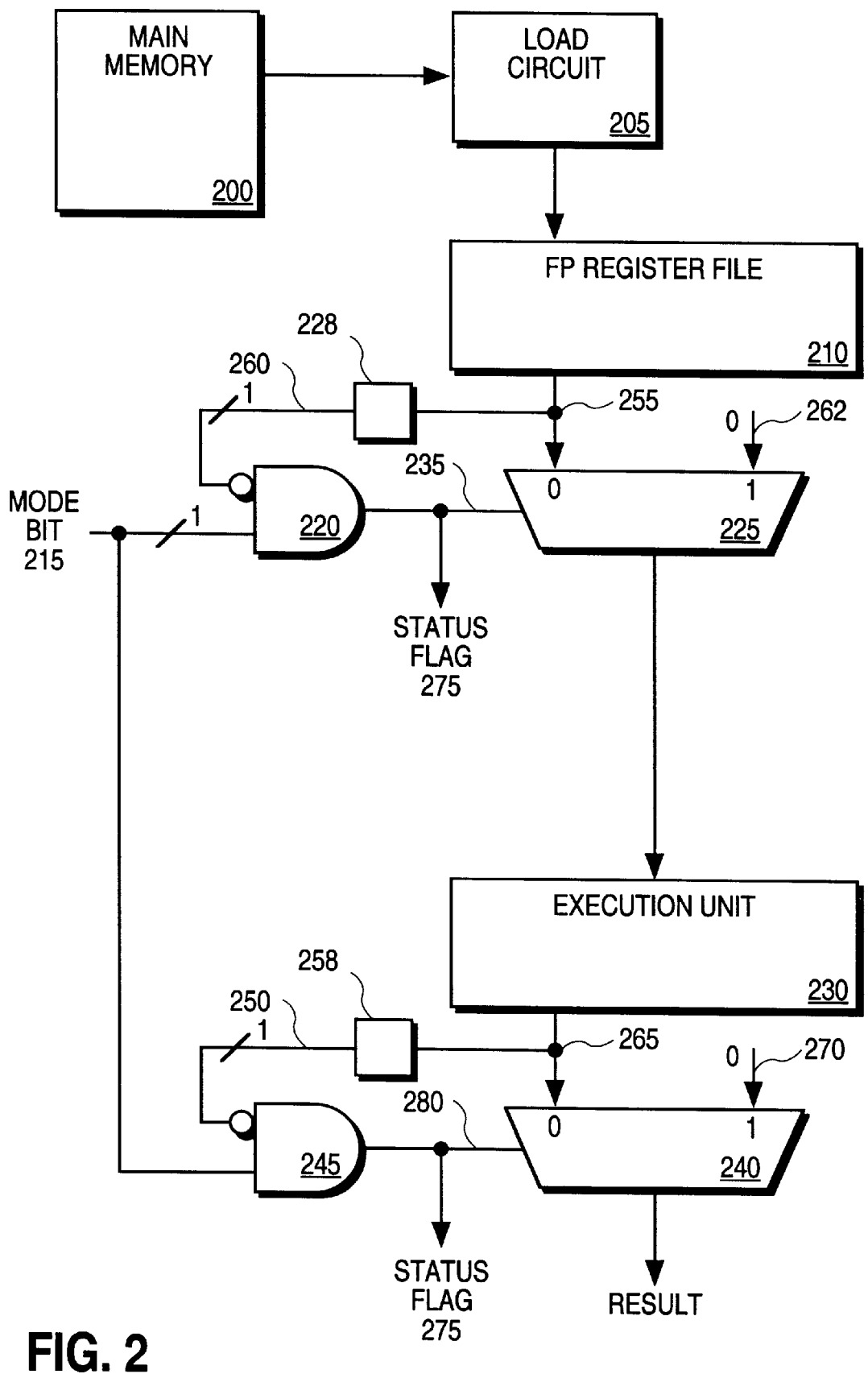
FIG. 2. shows an apparatus for improving the speed of handling of denormal numbers in a computer system, at the cost of some computational precision.

FIG. 2 shows the elements of an apparatus for improving the speed of handling of denormal numbers by a computer processor, at the cost of some computational precision Main computer memory 200 is coupled to floating point register file 210 through data load circuit 205. Memory 200 stores floating point data. In the present embodiment, memory 200 is a RAM, however, one skilled in the art will readily appreciate that other types of memory could be used without departing from the scope of the invention. For example, ROM, flash, magnetic tape, optical disk, or a hard drive could be used without departing from the scope or spirit of the invention.

Floating point register file 210 stores a floating point number loaded from memory 200, the floating point number being either normal or denormal. Multiplexer 225 receives the floating point number 255 from register file 210. The multiplexer 225 selects one of either the floating point number 255 from the register file 210, or the value 0. A select signal 235 is generated by ANDing the mode select bit 215 with an indication of whether the number is denormal 260. The indication 260 of whether the number is denormal is generated by denormal detect circuit 228. Circuits for detecting denormals are known in the art and the structure of denormal detect circuit 228 is therefor not recited here for the sake of simplicity. One of inputs 255 and 262 are selected to the output of mux 225, the output becoming the input to the execution unit 230. If the value zero is selected to replace the floating point number 255, then status flag 275 is set to indicate to the executing program that the replacement occured. Upon detecting that status flag 275 is set, the executing program may take steps to account for the lost precision.

In the preferred embodiment, mode select bit 215 is set under programatic control, when the user desires to trade computational precision for increased speed in handling denormal numbers. When mode select bit 215 is set, denormal numbers are replaced with 0 by mux 225 before being input to execution unit 230. Also, when mode select bit 215 is set, denormal output results 265 of execution unit 230 are replaced by zero by mux 240.

A numerical result is generated by executing a computer instruction using the data which is input to the execution unit 230, including the data output by multiplexer 225. Multiplexer 240 receives the output 265 from the execution unit 230. The multiplexer 240 selects one of either the output 265 of the execution unit 230 or the value 0. One of inputs 265 and 270 are selected to the output of mux 240 the output becoming the delivered result of the calculation by the execution unit 230. A select signal 280 and status flag 275 are generated by ANDing an indication 250 of whether the the number output 265 by the execution unit 230 is denormal, with the mode bit 215. The indication 250 of whether the number 265 is denormal is generated by denormal detection circuit 258. Circuits for detecting when a floating point number is denormal are well known to those of ordinary skill in the art of floating point hardware design.

When status flag 275 is asserted, the executing program can detect that a replacement by 0 of a denormal number has occured, and the program can then account for the resulting lost precision. When status flag 275 is not asserted, no replacement by zero occurs and the executing program knows that the result is either a normal number or a denormal number, and not the result of a replacement by zero. When the status flag 275 is not asserted, denormal numbers are not replaced by zero, but rather go through one of the predefined behaviors of either being normalized, or generating a denormal exception. Either behavior leads to a significant performance loss in the execution of the program, especially when large numbers of denormals are involved.

Alternate embodiments are possible which produce functionally similar results without departing from the scope and spirit of the invention. For example, the replacement of the denormal number with zero may occur within the load circuit 205 instead of at the input of execution unit 230.

Figure 3:
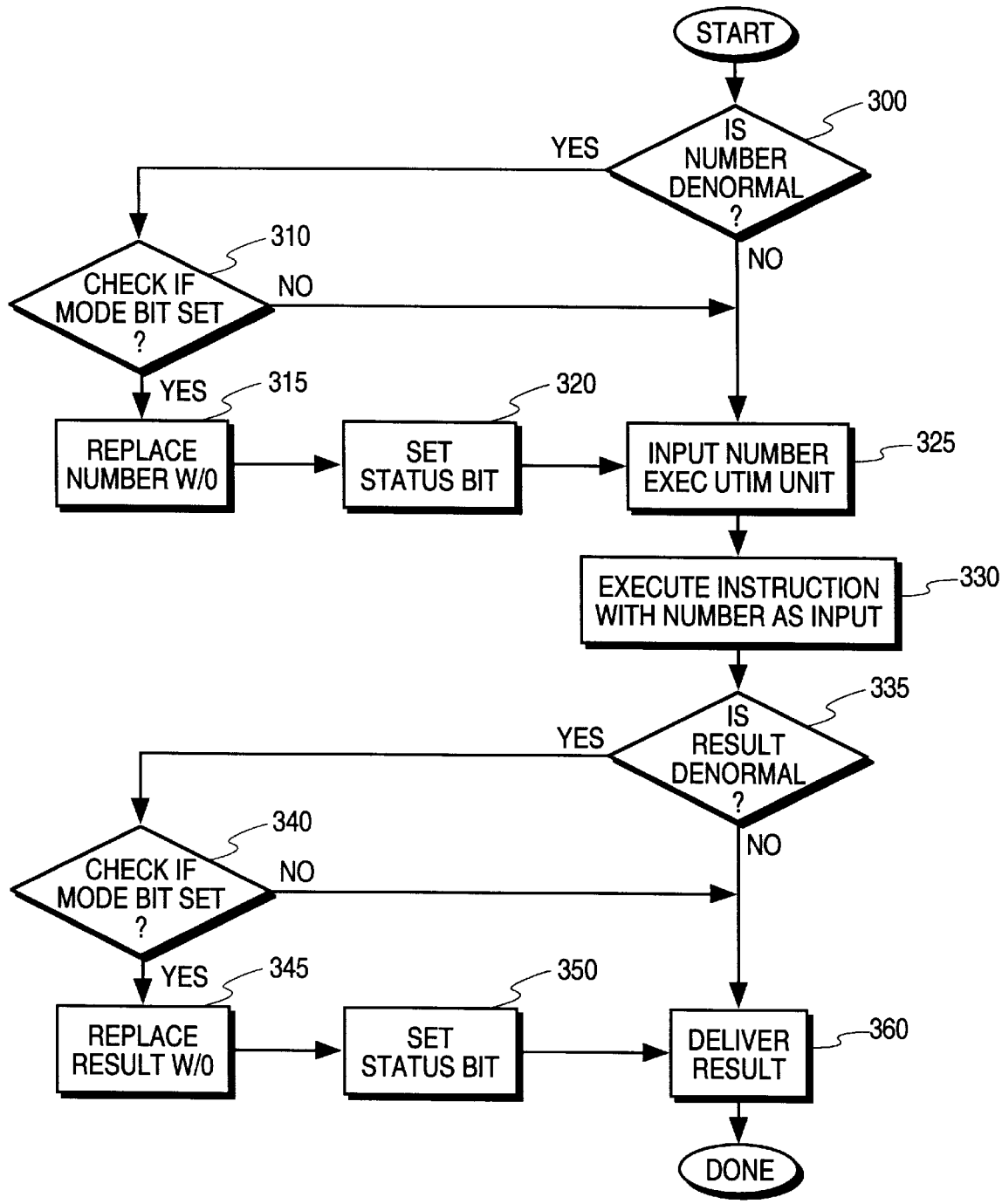
FIG. 3. illustrates the steps of trading some computational precision for improved speed of handling of denormal numbers.

FIG. 3 illustrates the steps of trading some computational precision for improved performance when processing denormal numbers. A decision is made at step 300. If the number to process is denormal, then step 310 is executed to check the setting of the mode bit. If the number is not denormal, then the number is input 325 to the execution unit without further processing. If the mode bit is set 310, the value 0 replaces 315 the number for input to the execution unit 325. A status bit is set 320 indicating replacement by zero. If the mode bit is not set 310, the denormal number is input 325 to the execution unit without being replaced by zero.

After selecting an input for the execution unit, the next step is to execute an instruction 330 using the input number as data. After executing an instruction 330 with the number as data, the next step is to check 335 whether the result of execution is a denormal number. If the number resulting from execution is denormal, then the setting of the mode bit is checked 340. If the number resulting from execution is not denormal 335, then it is delivered 360 as a normal result. If the mode bit is set 340, then the number is replaced by zero 345. A status bit is set 350 indicating replacement by zero. If the mode bit is not set, the result of execution is delivered as a denormal result.

Although this invention has been shown in relation to a particular embodiment, it should not be considered so limited. Rather, the invention is limited only by the scope of the appended claims.

What is claimed is:

1. An apparatus for improving a speed of handling of denormal numbers in a computer system, comprising:

a mode select line that carries a mode select bit signal that may be set to indicate when a denormal is to be replaced by zero;

a circuit that generates a select signal in a first state in response to receiving the mode select bit signal that is set and an indication of whether a floating point number is denormal and that generates a select signal in a second state otherwise; and a selector having a first input, a second input, and an output, the first input to receive the floating point number, the second input to receive the select signal, the selector coupling zero to the output when the select signal in the first state is received and the selector coupling the floating point number to the output when the select signal in the second state is received.

2. The apparatus of claim 1, wherein the selector comprises a multiplexer that receives the select signal and selects a value to become an output of the multiplexer in response to the select signal.

3. The apparatus of claim 1, wherein the select signal is generated by ANDing the mode select bit signal and the indication of whether the floating point number is denormal.

4. The apparatus of claim 1, wherein the select signal in the first state further sets a status bit indicating that the floating point number has been replaced by zero.

5. An apparatus for improving a speed of handling of denromal numbers in a computer system, comprising:

a mode select bit that may be set to indicate when a denormal number is to be replaced to zero; and a selector having a first input and an output, the first input to receive a floating point number, the selector coupling zero to the output when the mode select bit is set and the floating point number is denormal and coupling the floating point number to the output otherwise.

6. The apparatus of claim 5, wherein the selector comprises a multiplexer that receives a select signal and selects a value to couple to the output in response to the select signal.

7. The apparatus of claim 5, wherein the select signal is generated by ANDing the mode select bit and an indication of whether the floating point number is denormal.

8. The apparatus of claim 5, wherein the select signal further sets a status bit that indicates that the floating point number has been replaced by zero.

9. An apparatus for improving a speed of handling denormal numbers, comprising:
   mode selection means for setting an indication of when a denormal number is to be replaced by zero; and
   a selector means, having a first input and an output, the first input receiving a floating point number, the selector means coupling zero to the output when the indication is set and the floating point number is denormal and coupling the floating point number to the output otherwise.

10. A processor, comprising:
    an execution unit that processes floating point numbers;
    an apparatus that inputs floating point numbers to the execution unit, including
      a mode select line that carries a mode select bit signal that may be set to indicate when a denormal is to be replaced by zero;
      a circuit that generates a select signal in a first state in response to receiving the mode select bit that is set and an indication of whether a floating point number is denormal and that generates a select signal in a second state otherwise; and
      a selector having a first input, a second input, and an output, the first input to receive the floating point number, the second input to receive the select signal, the selector coupling zero to the output when the select signal in the first state is received and the selector coupling the floating point number to the output when the select signal in the second state is received.

11. The processor of claim 10, wherein the selector comprises a multiplexer that receives the select signal and that selects a value to couple to an output of the multiplexer in response to the select signal.

12. The processor of claim 10, wherein the select signal is generated by ANDing the mode select bit signal and the indication of whether the floating point number is denormal.

13. The processor of claim 10, wherein the select signal in the first state further sets a status bit indicating that the floating point number has been replaced by zero.

14. A processor, comprising:
    an execution unit that processes floating point numbers, the execution unit outputting a floating point result;
    an apparatus that receives the floating point result output by execution unit, including
      a mode select line that carries a mode select bit signal that may be set to indicate when a denormal is to be replaced by zero;
      a circuit that generates a select signal in a first state in response to receiving the mode select bit that is set and an indication of whether a floating point result is denormal and that generates a select signal in a second state otherwise; and
      a selector having a first input, a second input, and an output, the first input to receive the floating point result, the second input to receive the select signal, the selector coupling zero to the output when the select signal in the first state is received and the selector coupling the floating point result to the output when the select signal in the second state is received.

15. The processor of claim 14, wherein the selector comprises a multiplexer that receives the select signal and that selects a value to become an output of the multiplexer in response to the select signal.

16. The processor of claim 14, wherein the select signal is generated by ANDing the mode select bit signal and the indication of whether the floating point number is denormal.

17. The processor of claim 14, wherein the select signal in the first state further sets a status bit indicating that the floating point number has been replaced by zero.

18. A method for trading precision for performance in the processing of denormal numbers, comprising:
    receiving a floating point number;
    receiving a mode select bit;
    coupling a zero to an input of the execution unit if the floating point number is denormal and the mode select bit is set; and
    replacing the execution unit's output with a zero if the execution unit's output is denormal and the mode select bit is set.

19. A method for trading precision for performance in the processing of denormal numbers, compromising:
    allowing a user to set a mode select bit when precision may be traded for performance;
    receiving a floating point number;
    coupling a zero to an input of the execution unit if the floating point number is denormal and the mode select bit is set; and
    replacing the execution unit's output with a zero if the execution unit's output is denormal and the mode select bit is set.

20. A computer-readable medium having stored thereon a sequence of instructions, the sequence of instructions including instructions which, when executed by a processor, causes the processor to perform the steps of:
    receiving a floating point number;
    receiving a mode select bit;
    coupling a zero to an input of the execution unit if the floating point number is denormal and the mode select bit is set; and
    replacing the execution unit's output with a zero if the execution unit's output is denormal and the mode select bit is set.

21. A computer-readable medium having stored thereon a sequence of instructions, the sequence of instructions including instructions which, when executed by a processor, causes the processor to perform the steps of:
    allowing a user to set a mode select bit when precision may be traded for performance;
    receiving a floating point number;
    coupling a zero to an input of the execution unit if the floating point number is denormal and the mode select bit is set; and
    replacing the execution unit's output with a zero if the execution unit's output is denormal and the mode select bit is set.

* * * * *

UNITED STATES PATENT AND TRADEMARK OFFICE
CERTIFICATE OF CORRECTION

PATENT NO. : 6,105,047
DATED : August 15, 2000
INVENTOR(S) : Sharangpani et al.

It is certified that error appears in the above-identified patent and that said Letters Patent is hereby corrected as shown below:

<u>Column 4,</u>
Line 54, delete "denonmal", insert -- denormal --.
Line 55, delete "Modem", insert -- Modern --.

<u>Column 5,</u>
Line 7, delete "Modem", insert -- Modern --.
Line 9, delete "modem", insert -- modern --.

Signed and Sealed this

Twenty-third Day of April, 2002

Attest:

JAMES E. ROGAN
Attesting Officer      Director of the United States Patent and Trademark Office